United States Patent [19]

Gilboa

[11] Patent Number: 4,814,595
[45] Date of Patent: Mar. 21, 1989

[54] ELECTRONIC DATA COMMUNICATIONS SYSTEM

[75] Inventor: Ronnie Gilboa, Doar Na Galil Elyon, Israel

[73] Assignee: Electo-Galil Ltd., Kiryat Shmona, Israel

[21] Appl. No.: 174,224

[22] Filed: Mar. 28, 1988

[30] Foreign Application Priority Data

Mar. 27, 1987 [IL] Israel .......................................... 82025

[51] Int. Cl.⁴ .............................................. G06K 19/06
[52] U.S. Cl. ...................................... 235/492; 235/487
[58] Field of Search .................................. 235/487, 492

[56] References Cited

U.S. PATENT DOCUMENTS

4,758,718  7/1988  Fujisaka ............................. 235/492

Primary Examiner—Harold I. Pitts
Attorney, Agent, or Firm—Browdy & Neimark

[57] ABSTRACT

A data transmission system for the non-contact transmission of data between a station and a portable data card, both of which contain resonant circuits tuned to the same frequency. The data card receives power from the station via inductive coupling of the two resonant circuits and transmits data to the station by means of a loading circuit on the card which loads the card resonant circuit and hence, by mutual coupling, the station resonant circuit in response to data stored within the card. The card also contains a reading circuit containing a pulse generation circuit which generates a pulse whenever the power received by the card resonant circuit is interrupted and then restored. Data may thus be transmitted from the station to the card by deactuating the station resonant circuit in response to the data to be transmitted, the resulting pulses generated within the card being interpreted as the transmitted data.

33 Claims, 5 Drawing Sheets

ELECTRONIC DATA COMMUNICATIONS SYSTEM

BACKGROUND OF THE INVENTION

This invention relates to electronic data communications systems and, in particular, to a non-contact system for two-way communication between a station and a portable data card. Non-contact communications systems do not require the portable data card to be inserted into the station, but allow data transfer to be effected when the card is brought into close proximity with the station. Such data communication systems have been proposed for use in, for example, security systems, bank transaction systems and so on.

In U.S. Pat. No. 3,299,424 (Vinding) there is disclosed an interrogator-responder identificaton system in which the responder is identified when inductively coupled to the interrogator. The inductive coupling is achieved by means of resonant circuits tuned to the same frequency within the responder and interrogator, thereby enabling non-contact communication between the two.

In a preferred embodiment the responder is self-powered, deriving its dc supply voltage by rectifying a portion of the induced interrogator signal.

Data stored within the responder is read or identified, by the interrogator by means of a detuning or loading circuit coupled to the responder through a switch means. The switch means is activated in response to the stored data so as to load the responder resonant circuit, thereby decreasing its interaction with the interrogator resonant circuit. Consequently, the varying loading effect of the responder on the interrogator resonator circuit may be interpreted in terms of the responder data. For example, a signal corresponding to the responder data may be transmitted to the interrogator by amplitude- or phase-modulating the resonant frequency signal of the interrogator.

Whilst Vinding discloses a system in which a responder, self-powered by means of a signal transmitted by an interrogator, transmits data to the interrogator, there is no provision for writing data from the interrogator to the responder.

In U.S. Pat. No. 4,517,563 (Diamant), an identification system is disclosed similar to that of Vinding (above) in which an active transponder (a stationary reader) reads data stored within the memory of a passive transponder (a portable identifier). Communication between the reader and the identifier is achieved by means of tuned resonant circuits in both the reader and the identifier, thereby enabling communication to take place without physical contact between the two. The portable identifier is not equipped with its own independent power supply, but operates on power generated as a result of the inductive coupling between the resonant circuits in the transponders. Thus, Diamant also discloses a system in which power is transmitted from the reader to the identifier and data is transmitted from the identifier to the reader. However, there is no provision for transmitting data from the reader to the identifier.

In U.S. Pat. No. 4,605,844 (Haggan) there is disclosed a computerized data transfer system in which both power and data can be inductively transferred from a stationary reader to a portable card and, moreover, data can also be transferred from the card to the reader. Power and data in both directions are transferred between the reader and the card by means of three separate transformer coils located in both the reader and the card which are inductively coupled when the card is brought into very close proximity with the reader. Thus, although this arrangement permits two-way data communication between a reader and a portable card, it requires separate transformer coupling both for power transfer and also for data transfer in each direction. Moreover, owing to the poor inductive coupling inherent in such a system, such an arrangement will work only if the portable card is brought within extremely close proximity to the stationary reader.

SUMMARY OF THE INVENTION

It is an object of the invention to provide a non-contact system for two-way data transmission between a station and a portable data transaction card which overcomes some or all of the disadvantages associated with hitherto proposed systems.

According to the invention there is provided a data transmission system for the non-contact transmission of data between a station and a portable data card wherein the station includes:

a station resonant circuit tuned to a first signal, and a demodulator for detecting a second signal superimposed on the first signal, and wherein the portable data transaction card includes:

a card resonant circuit responsive to the station resonant circuit for inductive coupling therewith so as to receive power from the station, and a card data communications circuit designed to be powered by said received power for loading the card resonant circuit thereby modulating the first signal with the second signal in response to first data stored within the card data communications circuit and, by means of said inductive coupling, enabling the first data to be transmitted from the card to the station;

the improvement wherein there is further provided;

a station data communications circuit within the station for deactuating the station resonant circuit and, by means of said inductive coupling, for deactuating the card resonant circuit in response to second data stored in the station data communications circuit, and a reading circuit within the data card including:

a pulse generation circuit coupled to the card resonant circuit for generating a pulse in response to a predetermined change in state of the power received by the card resonant circuit, and a data converter coupled to the pulse generation circuit and responsive to said pulse, whereby the output of the data converter corresponds to said second data.

Preferably, the station resonant circuit is high-Q crystal control tuned circuit, the card resonant circuit is an LC circuit and mutual coupling is effected between them via antennae provided on both the station and the portable data card. Associated with the station resonant circuit is a frequency divider, the output from which functions as a carrier wave which is used to radiate power to the card resonant circuit and which may be amplitude modulated by a data signal derived from the card resonant circuit. The demodulator employs a bipolar junction transistor which functions as an ac amplifier and detector combined. The base of the transistor is fed with the modulated carrier signal and the demodulated signal appears at the emitter of the transistor. Superimposed on the demodulated signal is a relatively low amplitude high frequency ripple corresponding to the carrier signal and this is removed by means of a band pass filter, the output of which corresponds exactly to data transmitted from the portable data card.

The station data communications circuit includes means for altering the ratio of the frequency divider, thereby causing a shift in the frequency of the carrier signal. This frequency shift is arranged to be such that substantially zero voltage is induced in the card resonant circuit. By this means, the state of the card resonant circuit can be modified in accordance with data stored within the station data communications circuit.

The card data communications circuit contains a data converter and data memory which are activated by power radiated by the station resonant circuit and induced within the card resonant circuit by mutual coupling. The data converter is adapted to generate a data signal responsive to the contents of the data memory immediately it is activated by the radiated power. A loading circuit controlled by the data converter is arranged effectively to short out the card resonant circuit in response to logic "0" data transmitted by the data converter. The load on the second resonant circuit reacts on the station resonant circuit by mutual coupling and causes the carrier signal generated by the station resonant circuit to be modulated with the data signal transmitted by the portable card.

The reading circuit includes a resistor capacitor timing network in series with a diode network through which the capacitor is charged. The capacitor voltage discharges when the card resonant circuit stops receiving power from the station resonant circuit. This will occur when logic "0" data is transmitted by the station data communications circuit. When power is restored (logic "1"), the capacitor in the reading circuit will become fully charged almost instantaneously owing to the very low time constant of the diode capacitor network. This rise in voltage is sensed by the data converter which is adapted to reconstruct the data transmitted by the station.

The data transmission between the station and the card is bi-directional and is initiated by means of electromagnetic coupling between the station and the card. This obviates the need (as was proposed in the prior art referred to above) to mount separate transformer coils on both the station and the card to accommodate the transfer of power from the station to the card, as well as data transfer between the two. Moreover, by using high-Q resonant circuits in the station and the card, effective data communication and power transfer can take place without the need to bring the card as close to the station as would be required with a system utilizing transformer coupling.

BRIEF DESCRIPTION OF THE DRAWINGS

One embodiment in accordance with the present invention as applied to a portable data transaction card system will now be described with reference to the accompanying drawings, in which.

DESCRIPTION OF PREFERRED EMBODIMENT

Figure 1:
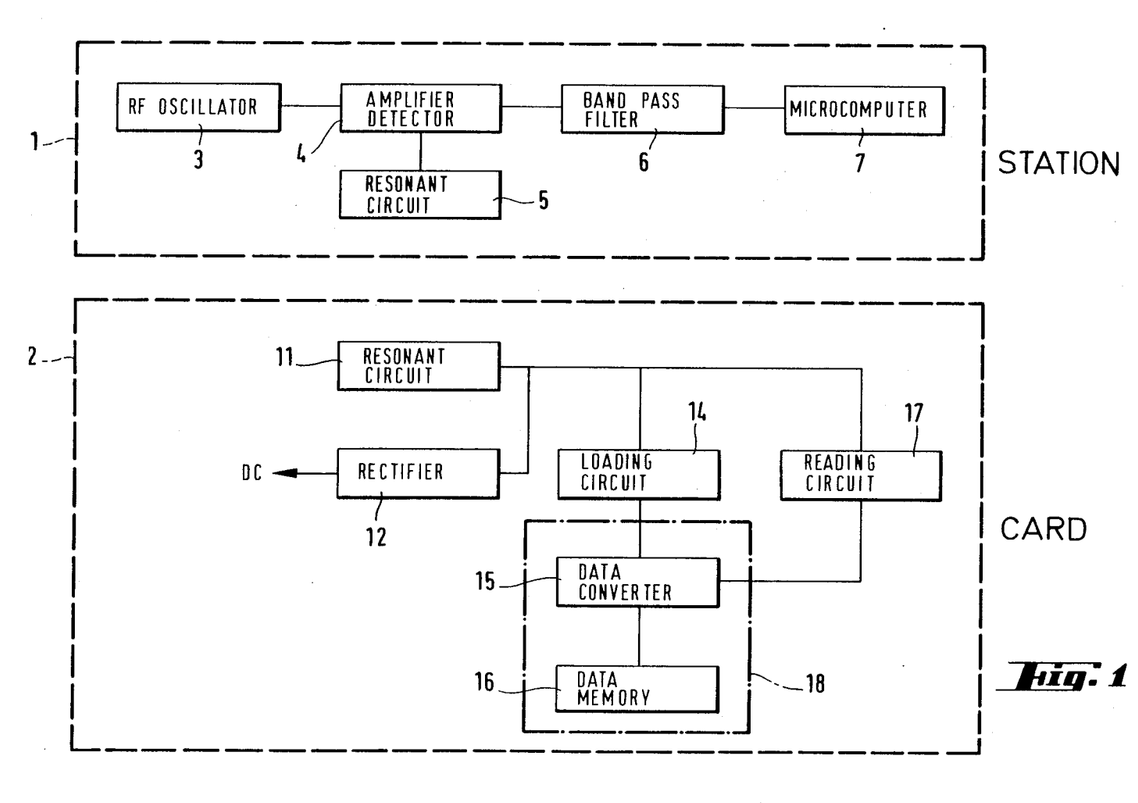
FIG. 1 is a block diagram showing schematically the system comprising a fixed station and a portable data transaction card.

As seen in FIG. 1 the system comprises a fixed station 1 (constituting an active transponder) and a portable data transaction card 2 (constituting a passive transponder). The fixed station 1 comprises an rf oscillator 3 which generates a radio frequency signal which is fed to an amplifier detector 4 coupled to a resonant circuit 5 (constituting a station resonant circuit). The output from the amplifier detector 4 is fed to a band pass filter 6 and thence to a first microcomputer 7 (constituting a station data communications circuit). The microcomputer 7 is arranged to control the output from the rf oscillator 3 so that the effective frequency of the signal fed to the resonant circuit 5 may be altered.

The portable data transaction card 2 comprises a resonant circuit 11 (constituting a card resonant circuit) whose output is fed to a rectifier 12 whose output is a dc voltage which provides power for the rest of the circuit. The resonant circuit 11 is also coupled to a loading circuit 14 connected to a data converter 15 whose output is fed to a data memory 16. Connected between the resonant circuit 11 and the data converter 15 is a reading circuit 17. The data converter 15 and the data memory 16 are preferably incorporated within a second microcomputer 18 and effectively constitute a card data communications circuit.

The operation of the station 1 is as follows. The rf oscillator 3 generates an rf signal which is amplified by the amplifier detector 4. The resonant circuit 5 is tuned to the frequency of the rf oscillator 3 and has a high Q factor causing it to resonate when the input signal is at the desired frequency, but substantially to stop resonating when the rf frequency is changed by more than a predetermined amount.

The function of the detector 4 is to detect a signal superimposed on the rf signal to which the resonant circuit 5 is tuned so that the rf signal can function as a carrier waveform which can be amplitude modulated by a suitable data signal generated within the data transaction card 2. The band pass filter 6 removes the rf component from the detected signal so that the original data signal may be processed and stored by the microcomputer 7. The microcomputer 7 provides means for adjusting the output frequency from the rf oscillator 3 so that the resultant shift in frequency is sufficient to prevent the resonant circuit 5 from resonating.

The operation of the portable data transaction card 2 is as follows. The resonant circuit 11 is tuned to the same resonant frequency as that generated by the fixed station 1. Consequently, when the card 2 is brought close to the station 1 the card resonant circuit 11 starts to resonate and the resultant induced voltage is fed to the rectifier 12. The output from the rectifier 12 is a dc voltage which provides power for the communications circuitry associated with the card 2.

Immediately power is suplied to the card 2, the loading circuit 14 is activated in accordance with data stored in the data memory 16. The loading circuit 14 functions like a switch which, under normal conditions, generates a logic "1". By normal conditions is meant that the loading circuit 14 remains open and the resonant circuit 11 is therefore unloaded. When the loading circuit 14 is activated, this loads the resonant circuit 11 thereby reducing its output and enabling transmission of logic "0". Thus, the loading circuit 14 must be repeatedly activated and deactivated in accordance with the data stored in the data memory 16. This is achieved by means of logic circuitry within the data converter 15 which, together with the loading circuit 14, constitutes modulating means for modulating the resonant frequency signal with the data signal generated within the card.

Figure 8:
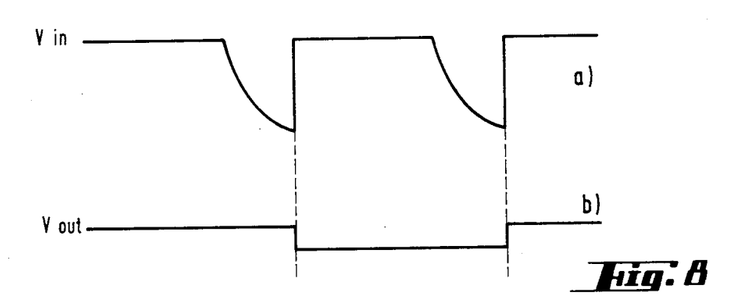
FIGS. 8a and 8b are a pictorial representation of the input and output voltage waveforms in the card data communications circuit.
Figure 9:
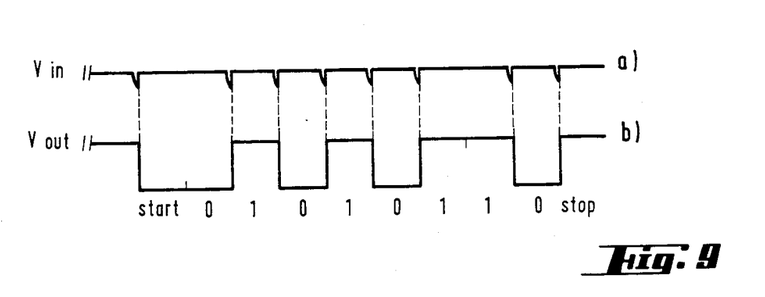
FIGS. 9a and 9b are a pictorial representation of a suitable protocol for data transfer from the station to the card.

The reading circuit 17 is designed to sense the condition of the resonant circuit 11 and functions like a JK flip-flop whose output toggles between logic "1" and "0" for each pulse of a clock input. By this means it is possible, as will be explained in greater detail with reference to FIGS. 7, 8 and 9 below, to write data from the station 1 to the card 2.

Figure 2:
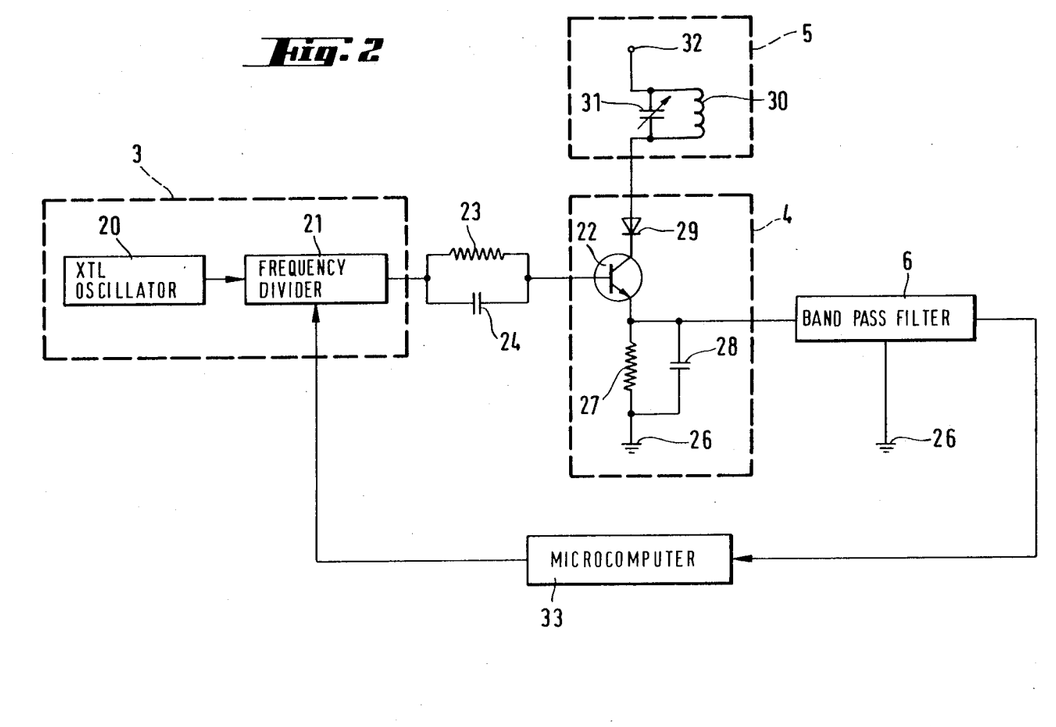
FIG. 2 is a partial circuit diagram of the station.

Reference will now be made to FIG. 2 which shows in more detail some of the station circuitry represented functionally in FIG. 1. The rf oscillator 3 referred to above comprises a crystal oscillator 20 which generates an rf signal of characteristic frequency. The output from the crystal oscillator 20 is divided by a frequency divider 21 and the resulting lower frequency rf signal is fed to the base of a bipolar junction transistor 22. Coupling between the frequency divider 21 and the transistor 22 is afforded by means of a suitable impedance comprising a parallel connection of a resistor 23 and a capacitor 24. The value of this impedance is chosen to match the logic voltage levels of the frequency divider 21 to the analogue voltage levels of the transistor 22. The emitter of transistor 22 is connected to ground 26 via a parallel combination of a resistor 27 and a capacitor 28. Connected to the collector of transistor 22 is the cathode of a diode 29 whose anode is connected to a parallel combination of a coil 30 and a tuned capacitor 31 whose other ends are connected to the positive voltage rail 32. The inductance and variable capacitance of the coil 30 and the capacitor 31, respectively, are so chosen that the resultant tuned circuit will resonate at the frequency of the signal generated by the rf oscillator 3. It will thus be clear that the coil 30 and the capacitor 31 are equivalent to the station resonant circuit 5 shown in FIG. 1.

The diode 29 functions as a buffer between the transistor 22 and the resonant circuit 5 and prevents the transistor 22 in the cut-off mode from loading the resonant circuit 5 and inhibiting oscillation. The combination of transistor 22, resistor 27, capacitor 28 and diode 29 functions as the amplifier detector 4 shown functionally in FIG. 1.

The voltage signal across the capacitor 28 is fed to the input of the band-pass filter 6 of known construction and is simply represented by a three terminal network (input, output and ground) in FIG. 2. The output from the band-pass filter 6 is fed to the microcomputer 7. The microcomputer 7 is arranged to alter the division ratio of the frequency divider 21 so that, under microcomputer control, the frequency of the signal generated by the rf oscillator 3 may be sufficiently changed to prevent the resonant circuit 5 from resonating.

Figure 3:
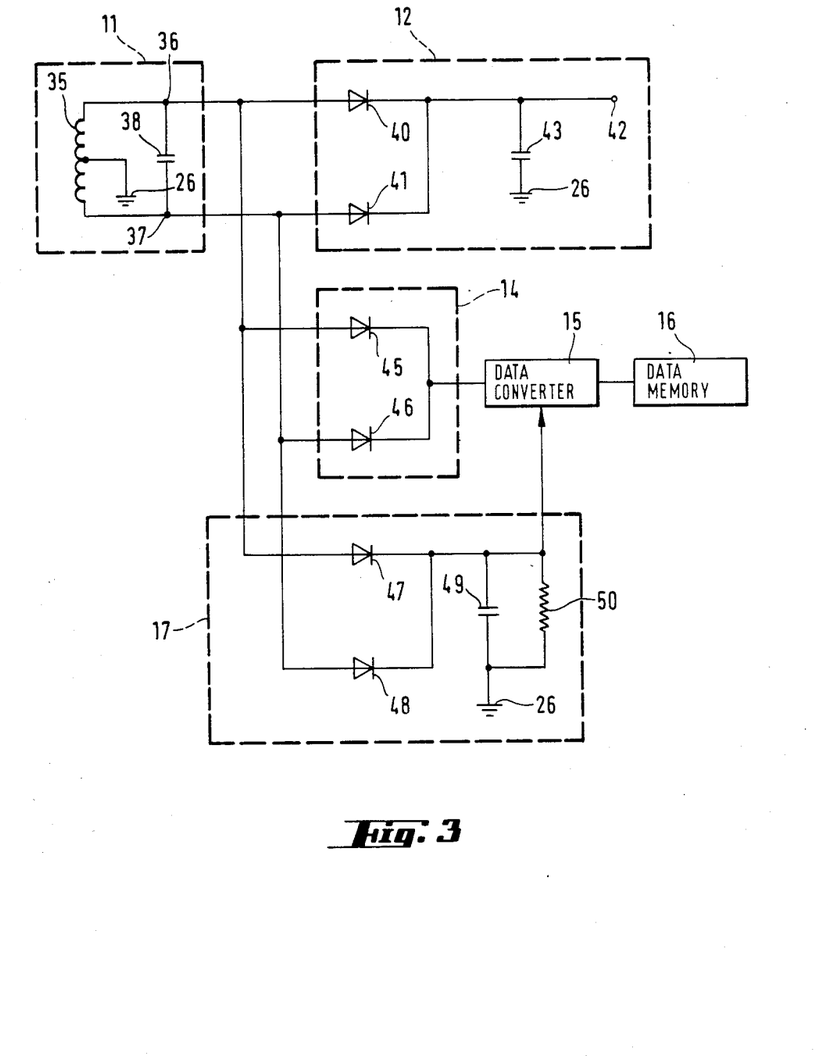
FIG. 3 is a partial circuit diagram of the data transaction card.

Reference will now be made to FIG. 3, which shows some of the circuitry associated with the data transaction card 2 shown functionally in FIG. 1. The card resonant circuit 11 comprises the centre-tapped coil 35 whose centre tap is connected to ground 26 and whose ends are connected to terminals 36 and 37 across which is connected a capacitor 38. The outputs from terminals 36 and 37 are fed, respectively, to the anodes of rectifier diodes 40 and 41. The cathodes of the rectifier diodes 40 and 41 are connected to a common terminal 42 which constitutes a positive voltage rail from which the card circuitry is powered. Connected between the positive voltage rail 42 and ground 26 is a smoothing capacitor 43 which reduces the ripple content of the rectified dc voltage signal. The combination of the rectifier diodes 40 and 41, together with the smoothing capacitor 43, constitutes the rectifier 12 shown functionally in FIG. 1.

Terminals 36 and 37 are also connected to the anodes of rectifier diodes 45 and 46, respectively, as well as to the anodes of rectifier diodes 47 and 48, respectively. The cathodes of diodes 45 and 46 are commonly connected to the input of the data converter 15. The diodes 45 and 46 constitute the loading circuit 14 shown functionally in FIG. 1. The cathodes of diodes 47 and 48 are commonly connected to a timing circuit comprising a capacitor 49 in parallel with a resistor 50 whose low voltage terminals are connected to ground 26. The combination of diodes 47 and 48, capacitor 49 and resistor 50 constitutes the reading circuit 17 shown functionally in FIG. 1 and whose output is fed to the data converter 15. It will be understood that whilst the reading circuit 17 may be built using discrete circuits, preferably the timing circuit comprising the capacitor 49 and the resistor 50 is included within the second microcomputer 18 constituting the card data communications circuit.

It has already been explained that the data transaction card 2 does not have its own power source but, rather, is powered by a voltage signal radiated by the station 1. The manner in which this is achieved is as follows. The card resonant circuit 11 starts to resonate when it is brought within a predetermined distance of the station resonant circuit 5 when the latter generates substantially the same frequency to which the card resonant circuit 11 is tuned. The magnitude of the voltage signal generated by the card resonant circuit 11 is a function of the distance between the station 1 and the card 2. In other words, the closer the card 2 is to the station 1 the greater will be the magnitude of the voltage signal induced in the card resonant circuit 11. Typically, it may be arranged for the amplitude of the voltage signal to vary up to 10V when the distance between the card 2 and the station 1 is 10 cm, according to the magnitude of the mutual coupling between the station 1 and the card 2. In order to prevent too high a dc voltage being applied to the card's data communications circuitry, a zener diode (not shown) is used to clip the voltage to a safe level.

Figure 4:
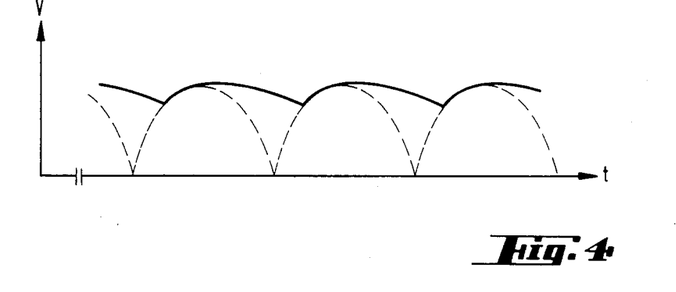
FIG. 4 is a pictorial representation of the rectified dc voltage waveform in the data transaction card.

FIG. 4 shows the form of the smoothed dc output generated by the rectifier 12.

Figure 5:
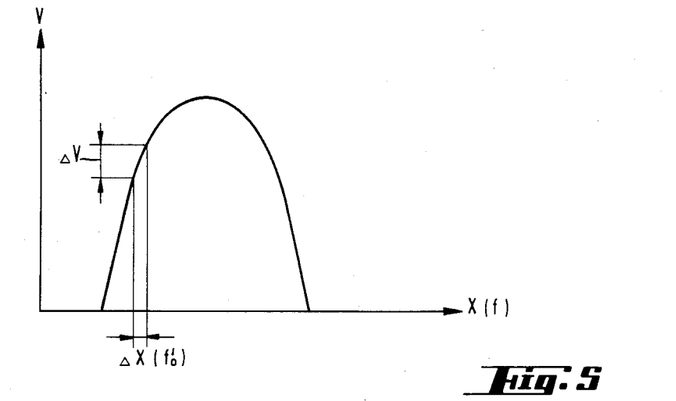
FIG. 5 is a pictorial representation of the voltage-reactance characteristic of the card resonant circuit.

FIG. 5 shows graphically the form of the voltage-reactance characteristic for the station resonant circuit 5. The characteristic curve is substantially parabolic in shape, with a peak voltage corresponding to the resonant frequency $f_o$. As the frequency varies in either direction from the resonant frequency, the reactance of the resonant circuit 5 will change correspondingly and the resonant circuit voltage will fall. It will be seen that on either side of the peak voltage of the voltage-reactance characteristic there is a substantially linear portion wherein, for a small change in the reactance of the resonant circuit, there is a correspondingly larger change in the voltage developed by the resonant circuit 5. It is this part of the characteristic, corresponding to a working frequency $f_o'$, which is preferably employed when it is desired for the station 1 to read data transmitted by the card 2. Such data is transmitted automatically as soon as power is radiated by the station resonant circuit 5 to the card resonant circuit 11 and rectified by the rectifier 12. The dc voltage thus generated activates the logic within the data converter 15 and causes it to transmit data pre-recorded within the data memory 16.

Figure 6:
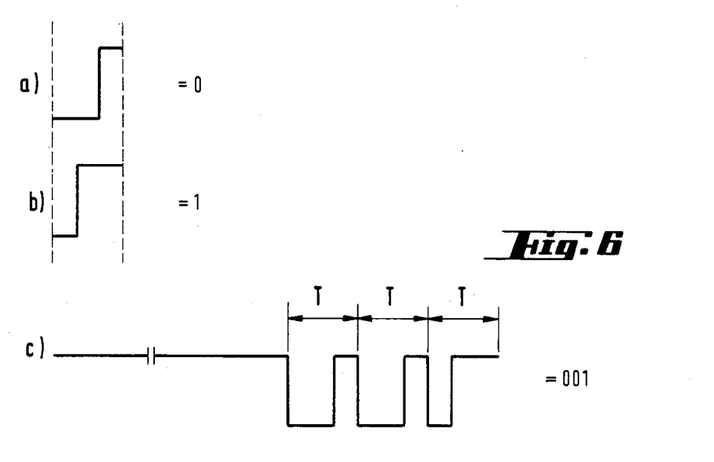
FIGS. 6a, 6b and 6c are a pictorial representation of a suitable protocol for data transaction from the card to the station.

FIGS. 6a, 6b and 6c illustrate the protocol according to which data is transmitted by the card 2. The data transmission pulses are of a standard pulse width which, for both logic "0" and "1", starts with a low voltage and ends at a high voltage. FIG. 6a shows the pulse shape for logic "0". In this case, the pulse voltage remains low twice as long as it remains high. FIG. 6b shows the opposite situation corresponding to logic "1". Here, the pulse voltage remains high twice as long as it remains low. FIG. 6c shows the form of the pulse train which would be generated in order to transmit 001 (binary). With no data being transmitted, the voltage is high and falls as soon as the first pulse (corresponding to logic "0") is transmitted. If the pulse period be represented by T, then the voltage remains low for $\frac{2}{3}T$ and then goes high for the remainder of the pulse period. It then falls for a further time $\frac{2}{3}T$ and rises for the rest of the second pulse period, corresponding to the transmission of a second logic "0". It then falls for a time of $\frac{1}{3}T$ and remains high for the rest of the pulse period, corresponding to the transmission of logic "1".

Figure 7:
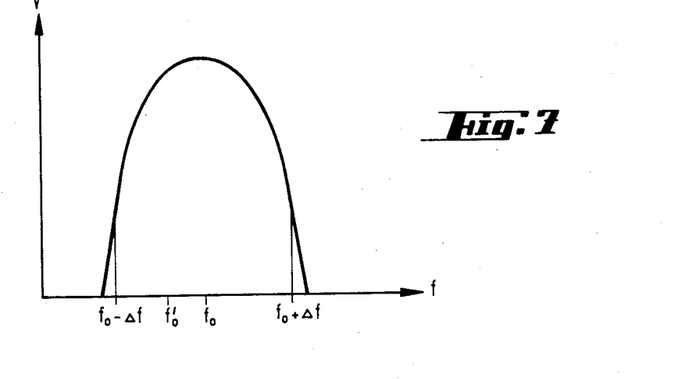
FIG. 7 is a pictorial representation of the voltage-frequency characteristic of the station resonant circuit.

Reference will now be made to FIG. 7, which shows the voltage-frequency characteristic of the station resonant circuit 5. The shape of the curve is substantially parabolic with a peak voltage corresponding to the resonant frequency of the circuit, represented by $f_o$ in the diagram. As the frequency of the resonant circuit varies either side of $f_o$, the resonant circuit voltage will fall. Depicted in FIG. 7 is a cut-off frequency $\Delta f$ such that at a frequency of $f_o \pm \Delta f$ the voltage generated by the station resonant circuit 5 is insufficient to cause the card resonant circuit 11 to resonate.

When it is desired to transmit data from the microcomputer 7 within the station 1 to the data transaction card 2, a control signal from the microcomputer 7 so alters the frequency-division ratio of the frequency divider circuit 21 (shown in FIG. 2) that the station resonant circuit 5 substantially ceases to resonate, as explained with reference to FIG. 7 above. This causes the card resonant circuit 11 also to stop resonating and, consequently, for the duration of the control signal transmitted by the microcomputer 7, power is no longer transmitted from the station 1 to the card 2.

The smoothing capacitor 43 within the rectifier 12 of the card 2 (see FIG. 3) and also the capacitor 49 within the timing circuit within the reading circuit 17 of the card 2 (as shown in FIG. 3) both start to discharge at rates determined by the time constants of the two circuits. The value of the smoothing capacitor 43 is chosen to be so much larger than that of capacitor 49 that capacitor 49 may substantially discharge while there still remains sufficient voltage across the smoothing capacitor 43 of the rectifier 12 to continue supplying power to the data communications circuitry provided within the data transaction card 2.

If, at this point, the microcomputer 7 within the station 1 is arranged to restore the rf oscillator frequency to its working value, $f_o'$, the station resonant circuit 5 will re-continue to resonate and, by mutual coupling, so will the card resonant circuit 11. The speed with which the station resonant circuit 5 is disabled and re-enabled is thus arranged to be sufficiently fast that the transfer of dc power to the card 2 is not interrupted. When the card resonant circuit 11 is re-enabled, the capacitor 49 within the reading circuit 17 is recharged through the diodes 47 and 48. Since these diodes have very low forward resistance, the capacitor 49 almost instantaneously recharges.

FIG. 8a shows the discharge-recharge characteristic of capacitor 49 for an input signal $V_{in}$ corresponding to two control signals transmitted by the station microcomputer 7 to the frequency divider circuit 21 within the rf oscillator 3. FIG. 8b shows the corresponding signal $V_{out}$ generated by the data converter 15 within the card 2. It will be seen from FIG. 8b that the state of $V_{out}$ (i.e. high or low) changes each time the capacitor 49 is recharged. Thus, by altering the time interval between which the capacitor 49 is arranged to discharge and subsequently recharge, the pulse width of $V_{out}$ may be adjusted correspondingly. Moreover, if a data transmission protocol for transmitting data from the station 1 to the card 2 be adopted with a standard pulse width, then by adjusting the width of successive pulses of $V_{out}$, the shape of $V_{out}$ may be interpreted as a serial pulse train corresponding to a combination of logic "0"s and "1"s transmitted by the station 1.

FIGS. 9a and 9b illustrate this concept in more detail. FIG. 9a shows the voltage waveform $V_{in}$ developed across the capacitor 49 in FIG. 3 for transmitting the data $56_{HEX}$ from the station 1 to the card 2. The data corresponding to 01010110 (binary) is transmitted as a serial pulse train delimited by suitable start and stop bits. With no data being transmitted, $V_{out}$ is an initial high voltage level which falls to a low voltage level corresponding to the transmission of the start bit. At the end of the data transmission, the voltage level of $V_{out}$ returns to, and remains at, its initial high voltage level to indicate the termination of data transmission. Comparing FIG. 9a with FIG. 9b, it will be seen how, for each pulse of $V_{in}$, the voltage level of $V_{out}$ toggles between "0" and "1". In order to transmit two consecutive "1"s, for example, it is only necessary to delay the transmission of the control signals from the microcomputer 7 for a time period corresponding to two pulse widths instead of one. This lengthens the time period between the pulses of $V_{in}$ accordingly as shown in FIG. 9a, thereby causing the voltage level of $V_{out}$ to remain unchanged during this time period. It will thus be appreciated that by disabling the station resonant circuit 5 in the manner described, data may effectively be transmitted from the station 1 to the card 2.

Although the preferred embodiment has been described with reference to a portable data transaction card, it will be appreciated that the invention may be equally employed within more general data transfer systems.

For example, in a security access system, an access code may be pre-stored within the card memory so as to permit restricted access to the bearer of the card dependent on the particular code stored therein.

The invention may also be utilized within a manufacturing system in which each workpiece carries an identity tag corresponding to the data card of the invention.

The identity tag not only identifies the workpiece, but also permits a record of each machining operation, for example, to be written to the identity tag so that it contains an up-to-date record of all operations performed on the workpiece.

The invention may also be employed as an automatic personnel time card or as a system for automatic debiting of a telephone subscriber's account, in which public telephones are adapted to read an account number from a data card carried by the subscriber, thereby obviating the need for regular subscribers to carry telephone tokens, pre-paid telephone cards and so on.

I claim:

1. In a data transmission system for the non-contact transmission of data between a station and a portable data card, wherein the station includes:
    a station resonant circuit tuned to a first signal, and
    a demodulator for detecting a second signal superimposed on the first signal,
    and wherein the portable data transaction card includes:
    a card resonant circuit responsive to the station resonant circuit for inductive coupling therewith so as to receive power from the station, and
    a card data communications circuit designed to be powered by said received power for loading the card resonant circuit thereby modulating the first signal with the second signal in response to first data stored within the card data communications circuit and, by means of said inductive coupling, enabling the first data to be transmitted from the card to the station;
    the improvement wherein there is further provided:
    a station data communications circuit within the station for deactuating the station resonant circuit and, by means of said inductive coupling, for deactuating the card resonant circuit in response to second data stored in the station data communications circuit, and
    a reading circuit within the data card including:
    a pulse generation circuit coupled to the card resonant circuit for generating a pulse in response to a predetermined change in state of the power received by the card resonant circuit,
    a data converter coupled to the pulse generation circuit and responsive to said pulse, whereby the output of the data converter corresponds to said second data, and
    means for coupling the output of the data converter to the card data communications circuit so as to store said second data therein.

2. The improvement according to claim 1, wherein the station data communications circuit includes first generating means for generating the second data.

3. The improvement according to claim 1, wherein the station data communications circuit is a suitably programmed microcomputer.

4. The improvement according to claim 1, wherein the station data communications circuit includes a deactuating circuit for deactuating the station resonant circuit in response to the second data.

5. The improvement according to claim 4, wherein the station resonant circuit is responsive to a first frequency signal, there being furthermore provided an oscillator for generating a second frequency signal which is converted to the first frequency signal by frequency divider means.

6. The improvement according to claim 5, wherein the frequency divider means is controlled by the station data communications circuit.

7. The improvement according to claim 6, wherein the deactuating circuit includes means for altering the division ratio of the frequency divider means so as to prevent the station resonant circuit from oscillating.

8. The improvement according to claim 1 wherein the portable data card further includes rectifier means coupled to a smoothing capacitor for rectifying the received power.

9. The improvement according to claim 1 wherein the card data communications circuit includes second generating means for generating the second signal.

10. The improvement according to claim 1 wherein the card data communications circuit further includes a loading circuit for loading the card resonant circuit in response to the second signal.

11. The improvement according to claim 1, wherein modulating means are provided for varying the first signal in response to the second signal.

12. The improvement according to claim 11, wherein the modulating means serve to effect amplitude modulation.

13. The improvement according to claim 1 wherein:
    the portable data card further includes rectifier means coupled to a smoothing capacitor for rectifying the received power, and
    the pulse generation circuit includes a capacitor for discharging when the power received in the card resonant circuit falls and recharging when the received power rises.

14. The improvement according to claim 13, wherein:
    the station further includes a deactuating circuit for deactuating the station resonant circuit in response to the second data, and
    the capacitor is adapted to discharge with a first time constant when the deactuating circuit is operated and to recharge with a second time constant when the deactuating circuit is disabled, such that:
    the first time constant is substantially greater than the second time constant, and
    the time interval between successive discharge and recharge of the capacitor is insufficient to cause the smoothing capacitor substantially to discharge.

15. The improvement according to claim 1 wherein the card data communications circuit is a suitably programmed microcomputer.

16. The improvement according to claim 15, wherein the reading circuit is at least partially included in the microcomputer.

17. In a station for use in a system according to claim 1, and including:
    a resonant circuit tuned to a first signal, and
    a demodulator for detecting a second signal superimposed on the first signal;
    the improvement wherein there is further provided:
    a data communications circuit for deactuating the resonant circuit in response to data stored within the data communications circuit.

18. The improvement according to claim 17, wherein the data communications circuit includes generating means for generating said data.

19. The improvement according to claim 17, wherein the data communications circuit is a suitably programmed microcomputer.

20. The improvement according to claim 17, wherein the data communications circuit includes a deactuating circuit for deactuating the resonant circuit in response to said data.

21. The improvement according to claim 17, wherein the resonant circuit is responsive to a first frequency signal, there being furthermore provided an oscillator for generating a second frequency signal which is converted to the first frequency signal by frequency divider means.

22. The improvement according to claim 21, wherein the frequency divider means is controlled by the data communications circuit.

23. The improvement according to claim 22, wherein there is further provided:
a deactuating circuit for deactuating the resonant circuit in response to said data, and including means for altering the division ratio of the frequency divider means so as to prevent the resonant circuit from oscillating.

24. In a card for use in a system according to claim 1, and including:
a resonant circuit responsive to a first signal, and
a data communications circuit designed to be powered by power received by the resonant circuit for loading the resonant circuit in response to data stored within the data communications circuit;
the improvement wherein there is further provided a reading circuit including:
a pulse generation circuit coupled to the resonant circuit for generating a pulse in response to a predetermined change in state of the power received by the resonant circuit, and
a data converter coupled to the pulse generation circuit and responsive to said pulse, whereby the output of the data converter corresponds to a data signal transmitted to the card.

25. The improvement according to claim 24, wherein there is further provided rectifier means coupled to a smoothing capacitor for rectifying the received power.

26. The improvement according to claim 24, wherein the data communications circuit includes generating means for generating a second signal in response to the data stored therein.

27. The improvement according to claim 26, wherein the data communications circuit further includes a loading circuit for loading the resonant circuit in response to the second signal.

28. The improvement according to claim 27, wherein modulating means are provided for varying the first signal in response to the second signal.

29. The improvement according to claim 28, wherein the modulating means serve to effect amplitude modulation.

30. The improvement according to claim 25, wherein:
the pulse generation circuit includes a capacitor for discharging when the power received by the resonant circuit falls and recharging when the received power rises.

31. The improvement according to claim 30, wherein:
the capacitor is adpated to discharge with a first time constant when the received power falls and to recharge with a second time constant when the received power rises, such that:
the first time constant is substantially greater than the second time constant, and
the time interval between successive discharge and recharge of the capacitor is insufficient to cause the smoothing capacitor substantially to discharge.

32. The improvement according to claim 24, wherein the data communications circuit is a suitably programmed microcomputer.

33. The improvement according to claim 32, wherein the reading circuit is at least partially included in the microcomputer.

* * * * *